United States Patent [19]

Cress

[11] Patent Number: 5,184,405
[45] Date of Patent: Feb. 9, 1993

[54] METHOD AND DEVICE FOR FITTING TORIC CONTACT LENSES

[76] Inventor: Jonathan Cress, 145 Bayona Dr., Santa Cruz, Calif. 95060

[21] Appl. No.: 809,744

[22] Filed: Dec. 18, 1991

[51] Int. Cl.⁵ .......................... G01B 5/24; A61B 3/00
[52] U.S. Cl. .................................... 33/1 SD; 33/507; 351/247
[58] Field of Search ............... 33/1 SB, 1 SD, 1 BB, 33/507, 200; 351/204, 219, 247, 161; 116/318

[56] References Cited

U.S. PATENT DOCUMENTS

| | | | |
|---|---|---|---|
| D. 249,656 | 9/1978 | Mihail | 33/1 SD |
| 1,528,138 | 3/1925 | Watson | 33/507 |
| 1,532,878 | 4/1925 | Bugbee | 33/507 |
| 1,564,495 | 12/1925 | Shears | 33/507 |
| 2,250,521 | 7/1941 | Boeder . | |
| 2,279,795 | 4/1942 | Nissel . | |
| 3,045,353 | 7/1962 | Barbosa | 33/1 SB |
| 3,108,523 | 10/1963 | Nuchman et al. . | |
| 3,190,257 | 6/1965 | Blythe, Jr. | 116/318 |
| 3,404,936 | 10/1968 | Bennett . | |
| 3,432,927 | 3/1969 | Springer | 33/1 SD |
| 3,439,979 | 4/1969 | Morgan . | |
| 3,721,007 | 3/1973 | Banner | 33/1 SD |
| 3,781,096 | 12/1973 | Townsley . | |
| 4,063,805 | 12/1977 | Gannon et al. . | |
| 4,179,195 | 12/1979 | Krumeich et al. . | |
| 4,268,133 | 5/1981 | Fischer et al. | 351/161 |
| 4,396,261 | 8/1983 | Herbert . | |
| 4,582,404 | 4/1986 | Hamilton . | |
| 4,976,533 | 12/1990 | Hahn et al. | 351/219 |

Primary Examiner—Thomas B. Will
Attorney, Agent, or Firm—Townsend and Townsend

[57] ABSTRACT

A device having a single protractor scale for determining a therapeutic axis for toric contact lenses based on a prescription axis. The device comprising a coaxially mounted card, protractor dial and reference symbol. Alternate embodiments if the invention are set forth, depending on the specific embodiment the protractor scale may be depicted in a counter-clockwise or clockwise orientation. Additionally, methods for employing alternate embodiments of the present invention are set forth.

14 Claims, 2 Drawing Sheets

METHOD AND DEVICE FOR FITTING TORIC CONTACT LENSES

BACKGROUND OF THE INVENTION

The present invention relates to a device and method to be used in determining one of the parameters that will be required when prescribing toric contact lenses for patients with visual astigmatism.

Visual astigmatism is the result of differences in the radii of curvature of the cornea and/or the lens of the eye. The extent of astigmatism, or other refractive impairment, is disclosed during the process of refractive error determination called refraction. What is found during the process is the radius or radii of curvature of the lens necessary to correct the eye's refractive error. There is astigmatism if there are two radii disposed at 90° relative to one another. In an astigmatic eye, one of these radii will be longer than the other. The longer radius, corresponding to a flatter curve of the cornea and/or lens, is generally referred to as the sphere. The shorter radius is referred to as the cylinder. The opposite designations are used with the corrective lens i.e., the longer lens radius is referred to as the lens cylinder while the shorter radius is the lens sphere.

Due to variations in the radii of curvature of the optical elements (cornea or lens), an astigmatic eye does not function as an optically symmetrical lens with a single focal plane. Instead, an astigmatic eye functions as a toric lens and has a zone of blur between the two principle focal planes of the system. A toric lens is one which has two different radii of curvature oriented at 90° to one another. These two different radii of curvature cause images to be focused in a zone and depth rather than on a flat plane, resulting in visual distortion or blurring.

The refractive error, i.e., the eyeglass prescription, of an eye sets forth the optic parameters necessary to bring the focal plane of the eye's lens system onto the retina of the eye. As indicated above, in an astigmatic eye these parameters will define a "toric lens."

To remedy astigmatism, a toric lens has a long and a short radius of curvature, each of which is appropriate to neutralize its corresponding radius of curvature of the eye at the appropriate axis so that the newly created focal plane is on the retina. The prescription toric lens must have a 90° orientation from the respective radii of the eye in order to effectively cancel astigmatic variations. That is, the short radius of the contact lens is aligned to the long radius of the eye and the long radius of the contact lens is aligned to the short radius of the eye. Thus, the prescription radii are oriented relative to the radii of the eye, and the eye's radii are defined relative to a standardized scale of rotation. The standardized rotation scale is set forth in degrees and is termed an axis measurement. The prescription lens (as defined by the sphere, the cylinder and the axis of the cylinder) will correct for optic errors so that an image will be focused in a single plane, on the retina. Accordingly, the optic variations of an astigmatic eye are canceled and improved vision results.

The foregoing process overviews the steps undertaken when determining an eyeglass prescription. When fitting contact lenses to an astigmatic patient, additional steps are required. As a starting point, the refractive error of the eye is determined, as discussed above, which provides the parameters for the sphere, cylinder and the axis of the cylinder. Additionally, for contact lenses the curve of the cornea will be measured to determine the base, i.e., the back curve, of the contact lens. A contact lens having the proper back or base curve is the one which will be most likely to fit the eye. Thereafter, taking all these parameters into account, a trial contact lens is selected.

Still further steps are involved when fitting toric contact lenses. Additionally, and most importantly for the purpose of the present invention, the fitting of toric contact lenses must also include an evaluation of the lens' rotational settling on the eye. Rotation of a toric prescription lens will displace the lens from its appropriate axis. Altering the axis is problematic because the lens will only be effective when its radii are oriented 90° from the corresponding radii of curvatures of the astigmatic eye. Notably, toric lenses only function correctively when in a single orientation on the eye. For toric lenses in eyeglasses, uniform orientation is assured since the eyeglasses will be securely positioned on the patient's face. In contrast, to assure a uniform orientation of a toric contact lens, a pendulum-like mechanism will often be used. A pendulum-like mechanism may be accomplished, for example, by providing the lens with a prism ballast located outside the optical zone. When a ballasted lens is placed on the eye, gravity will cause the ballasted section to move to the lowermost position. Although a pendulum-like mechanism helps to achieve the maintenance of a proper uniform orientation of a toric contact lens on the eye, rotational displacement cannot be entirely avoided. Lens axis misalignment will often occur due to the relation of the contact lens base and the surface of the eye.

Thus, evaluation of the lens' rotational settling is required. The toric contact lens prescription for patients on whom such settling occurs will include a corrected axis determination to alleviate the optic deviations induced by this misalignment.

To evaluate rotational displacement, a contact lens fitter will place a trial contact lens having the prescription sphere, cylinder and axis of that cylinder on the patient's eye. The trial lens for this process will have an orientation mark on the lens outside the optical zone. The orientation mark may, for example, be produced on the lens by etching. The orientation mark will typically be a line or dot at a 6 o'clock or 3 o'clock position.

The correction produced by toric lenses and the process for evaluating rotational settling of a toric contact lens will by illustrated with reference to FIGS. 1-3. In FIG. 1, a human eye 2 is depicted showing a long optic radius A' disposed at a 90° angle to a short optic radius B'; disposed outwardly from the eye is a toric contact lens 4 which has a long optic radius A" disposed at a 90° angle to a short optic radius B". Radius A" has the curvature necessary to bring the focal plane of the eye's radius B' onto the retina and radius B" has the curvature necessary to bring the focal plane of the eye's radius A' onto the retina so that the focal plane of all 360° of the cornea/lens system is flat on the retina creating a clear image. As shown in FIG. 1, the long radius A" of the contact lens will ideally be rotated 90° relative to the long optic radius A' of the human eye; radii B" and B'have an analogous orientation as well. Referring to FIG. 2, when the toric contact lens, with an ideal orientation, as described in FIG. 1, is placed on an eye, the respective radii are coincident. Accordingly, the refractive error of the eye is canceled by the optic parameters of the toric contact lens.

After the trial contact lens is placed on the eye in its ideal orientation, it is allowed to settle for a period of approximately half an hour. After the lens has settled, it is observed for its positioning on the cornea. Particularly important will be the rotation if any, to a new axis, that the lens has assumed on the cornea. Rotation of the lens to a new axis is illustrated in FIG. 3. Rotation of the lens to a new axis is evidenced by the position of orientation mark 3, which is visible to the contact lens fitter. With the optic axis coincident as in FIG. 2, the optic variations of an astigmatic eye are canceled. However, in the settled, rotated position of FIG. 3, the axes are no longer coincident and the rotational error must be accounted for when determining the contact lens prescription.

Should rotation to a new axis of a toric lens occur, the contact lens fitter is beset with two problems. First, the actual number of degrees of rotation must be determined, and second the correction value for the prescription axis must be ascertained. The correct axis will be found an equal number of degrees in the direction opposite the 6:00 or 3:00 o'clock position of rotation of the settled lens.

Previously, lens rotation has been evaluated by observing the relative position of the orientation mark at the periphery of the lens; correlating this observation with an estimated number of degrees of rotation from the known reference point. The contact lens fitter would simply make an educated guess as to the number of degrees of rotation. After estimating the rotation, the fitter would then calculate the therapeutic axis for a contact lens by determining the axis measurement which falls an equal number of degrees from the original reference point, but in an opposite direction from the rotary movement of the settled lens. The therapeutic axis is the axis parameter of a toric contact lens which will effectively provide the prescription axis, once the contact lens has settled on the eye.

The estimating method for determining the therapeutic axis of a toric contact lens has two principal weaknesses. First, it is difficult to accurately estimate the rotation of a lens to within 10°. Second, the calculation is prone to possible error. Quite commonly, a fitter, especially an occasional fitter, will become confused as to whether the rotational movement would necessitate an adding to, or subtracting from the prescription axis.

A prior art device has attempted to address these problems. CIBA Vision, a manufacturer of toric soft contact lenses, has produced a device called the TORISOFT TM Rx Axis Dial. The TORISOFT TM device 5, FIG. 4, was developed specifically for use with contact lenses having an orientation mark on a 3 o'clock-9 o'clock line. The device consists of two counterclockwise protractor scales. One of these counterclockwise scales 14 is depicted on a front face of card base 12, the other counter-clockwise scale 8 is located on a dial 6 mounted on a front face of the card. Card 12 and dial 6 are coaxially joined at hub 10. To employ the device, dial 6 is rotated so that the line on dial 6 between 180°—180° is placed in an orientation of a 3 o'clock-9 o'clock line. This orientation corresponds to the initial alignment of the orientation mark of test lens on the eye. Thereafter, dial 6 is rotated by an angle corresponding to the rotation of the reference mark on a settled test lens. The fitter then refers to the number on card base protractor scale 14 which corresponds to the prescription axis. To ascertain the therapeutic axis to be used when ordering the contact lens, the fitter then reads the number on protractor scale 8 which is aligned with the prescription axis value on the card.

Use of the TORISOFT TM device has been problematic for a number of reasons. Although the use of counter-rotating protractors is a workable way of determining the number of degrees of rotation, especially as compared to the estimating method of the prior art, it is not a method which is consistent with, or analogous to, the thought processes undertaken by a fitter.

Three fundamental steps are carried out in the mind of a contact lens fitter when determining a toric contact lens prescription. First, the theoretical prescription is determined. Second, the rotation of the sample lens is evaluated. Third, the appropriate contact lens will be ordered based on the modified axis.

The TORISOFT TM device is busy, cluttered, and has directions which are difficult to follow because they present the "classic" fitting steps in a dissimilar, confusion-inducing order. Namely, the fitter must first determine where the lens rotates. Second, the fitter must find the theoretical axis on a busy cluttered device and third, determine the cylinder axis to be ordered based on finding a second number on a second protractor.

A second prior art device has also attempted to address the problems encountered by a fitter of toric contact lenses. This second device is produced by SOLA/Barnes Hind, and is specifically designed for use with Hydrocurve II TM toric contact lenses. The Hydrocurve II TM device 40 is illustrated in FIG. 5, and is shown to consist of a card 42 having a protractor scale 44 and an index marker 46 depicted thereon. Mounted on the front face of card 42 is a protractor dial 48 having a clockwise protractor scale 50 from at least 0° to 180°. Mounted over the protractor dial 48, is an orientation dial 52 having a reference symbol 54 and an indicator mark 56. Card 42, protractor dial 48, and orientation dial 52 are coaxially joined at hub 58.

The Hydrocurve II TM device 40 is only suitable for test toric contact lenses, such as Hydrocurve II TM lenses, which have an orientation mark that settles at the six o'clock position. Device 40 will be employed after a suitable test toric lens has been placed on a patient's eye, and the lens has been allowed to rotate to accommodate to the shape of the patient's eye. The first step in employing device 40 entails orienting the numeral on protractor scale 50 which corresponds to the patient's prescription axis with the index marker 46. Second, reference symbol 54 on orientation dial 52 is placed into alignment with the orientation mark on the test lens, after the lens has rotated into its settled position. During the foregoing, it is vital that the numeral on protractor scale 50 corresponding to the prescription axis must be maintained in alignment with index marker 46. It is also vital that device 40 be maintained at an alignment so that the 0° value on protractor scale 44 is at a six o'clock position, which corresponds to the known initial position of the toric test lens orientation mark. Thereafter, should each of the requisite alignments be maintained the numeral on protractor dial 50 corresponding with the therapeutic axis will be indicated by the position of indicator mark 56.

While it is an improvement over purely visual evaluations, use of the Hydrocurve II TM device 40 presents a contact lens fitter with myriad problems. These problems limit, both, the ease of use and the accuracy of the Hydrocurve II TM device.

When utilizing the Hydrocurve II TM device, the fitter will need to maintain protractor dial 48 at the position so that the numeral on scale 50 corresponding to the prescription axis is maintained at index marker 46, while simultaneously moving the orientation dial 52 so as to align reference symbol 54 with the orientation mark on the test toric contact lens. The fitter must use great care in order to assure that the necessary alignments are not lost. Even with care, it is quite easy to inadvertently move protractor dial 48 when aligning reference symbol 54 on the orientation dial with the orientation mark of the test toric contact lens. Should the protractor dial be moved, the numeral indicated by indicator mark 56, as the end result of Hydrocurve II TM device use, will be incorrect. The design of Hydrocurve II TM device 40 predisposes that device to yield erroneous results.

Furthermore, the protractor scale 44 of the Hydrocurve II TM device is substantially entirely visible to the person using that device, more than 220° of the 360° scale are visible. Thus, the fitter can easily become confused by the array of small numerals depicted on the protractor scale, and could readily misread the device.

The design of Hydrocurve II TM device 40 causes it to be prone to erroneous readings in yet another way. The Hydrocurve II TM device necessitates that rotational orientation of a test lens be measured using a separate protractor scale which must be mounted on the control knob of to a slit lamp (biomicroscope). Accordingly, the fitter may inadvertently mis-align the device, which will induce errors in the therapeutic axis result.

Thus, it would be desirable to provide an improved device and method to assist in the fitting of toric contact lenses. In particular, it would be desirable to provide methods and devices which are easy and logical to use, and which decrease the chance of error.

SUMMARY OF THE INVENTION

The present invention comprises a calculator and method for determining the therapeutic toric axis of toric soft contact lenses, which overcome the problems of the prior methods described above. A calculator is provided which, both, produces accurate values and is not prone to erroneous readings. One preferred embodiment of the calculator of the present invention includes a card having a window, a first circular dial rotatably mounted on a rear face of the card, the dial having numerals of a protractor scale from at least 0° to 180° depicted thereon in a counter-clockwise orientation, the dial mounted so that the numerals can be visualized as they move past the window, and a transparent dial having a reference symbol mounted on the front face of the card, coaxially with the first circular dial on the card. Preferably, the transparent dial will be a representation of a contact lens which has an orientation mark. Additionally, it will be preferable for the card to have a representation of a human eye depicted on the front face of the card.

A primary objective of the preferred embodiment is that the fitter of toric contact lenses may easily and accurately ascertain the therapeutic axis to be ordered. The steps employed in using the calculator correspond to the specific mental processes carried out by a fitter of toric contact lenses. Most advantageously, the ease of use and accuracy of the device will be facilitated when the card and the transparent dial are representations of the eye and the lens, respectively.

Accordingly, the fitter will first consider the "prescribed" prescription axis by aligning this number on the protractor scale through the window and aligning the orientation mark of the transparent front dial with the desired number in the window; second, rotation of the lens will be addressed as the fitter will rotate the reference symbol on the transparent dial simultaneously with the protractor dial, until the reference symbol is at the same orientation as the settled position of the orientation mark on the sample contact lens. The therapeutic axis can then be read from the protractor scale through the window.

Since the thought processes used for the present invention parallel those used in fitting toric contact lenses, the ease of use and accuracy of the result obtained with the calculator is enhanced. Additionally, the present invention has a single protractor scale which is covered by the card except for the numeral visible through the window. Thus, the possibility of confusion is limited since only one numeral will be visible at a given time. Only the precise values on the protractor scale corresponding to the theoretical prescription axis and the therapeutic prescription axis will be visible at the window, at the initial and final stages of axis calculation respectively. Thus, the preferred embodiment further decreases the possibility of calculation error.

One of the primary advantages of the invention is its simplicity. A heretofore convoluted calculation may now be accomplished in a substantially more straightforward, elegant manner. It is particularly advantageous that use of present invention is more straightforward, as a contact lens fitter will frequently be called upon to make the toric axis calculation in a clinical setting which presents numerous distractions. Accordingly, the present invention is especially suited for use in the clinical setting.

An alternate preferred embodiment of the present invention is also provided. The alternate embodiment utilizes a device which is essentially identical to the device of the preferred embodiment, except that the numerals on the protractor scale are depicted in a clockwise orientation. Accordingly, when utilizing the alternate embodiment the fitter first rotates the protractor dial so that the numeral corresponding to the prescription axis is visible through the window. The transparent dial will then be rotated so that the reference symbol on the transparent dial is aligned with the orientation mark of the settled test lens. Thereafter, the transparent dial and the protractor dial are rotated in unison, as the reference symbol is brought into alignment with the initial position of the orientation mark of the test lens. The effective axis value will then be provided, as it will be visible through the calculator window.

Other features and advantages of the invention will appear from the following description in which the preferred embodiments have been set forth in detail in conjunction with the accompanying drawings.

DESCRIPTION OF THE PREFERRED EMBODIMENTS

Figure 1:
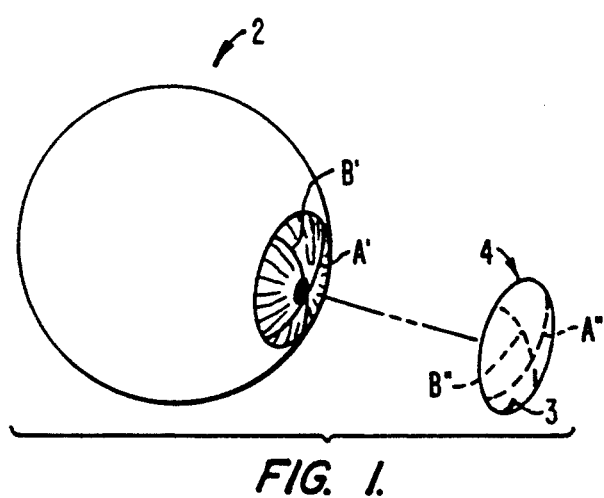
FIG. 1 is an exploded, perspective view of an eye showing optic axes; and a contact lens also showing optic axes.
Figure 2:
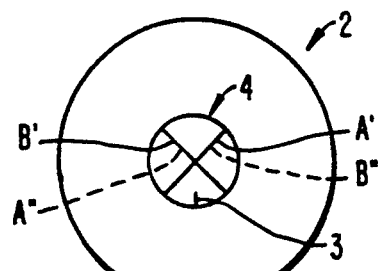
FIG. 2 is a frontal view of an eye with a contact lens inserted, where the axes of the eye and the axes of the contact lens are coincident.
Figure 3:
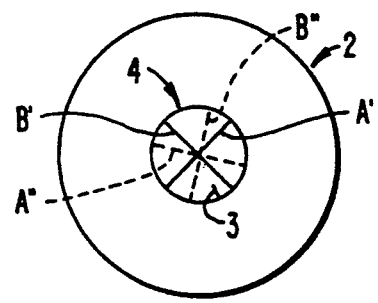
FIG. 3 is a front view of an eye with a contact lens inserted, and after the contact lens has settled and the axes of the contact lens have rotated relative to the axes of the eye.
Figure 4:
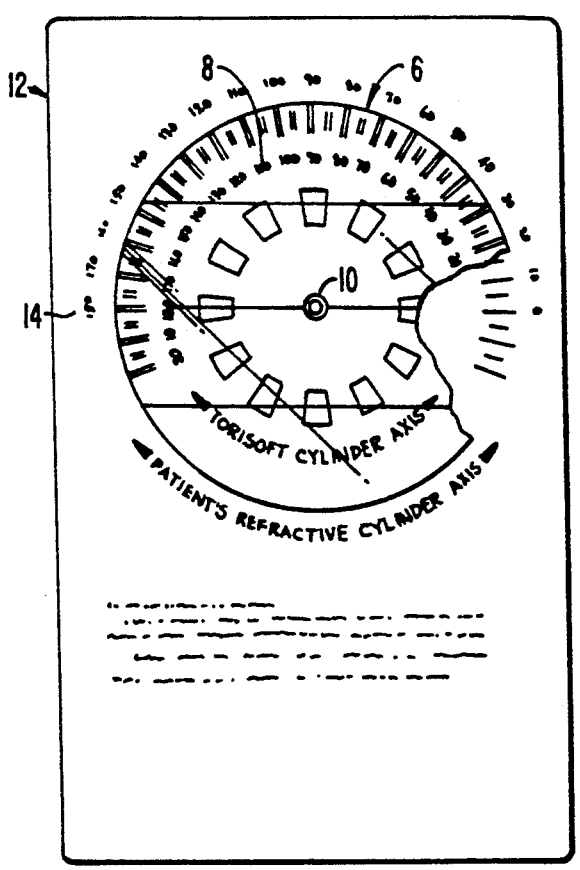
FIG. 4 is a front view of the dual protractor toric axis calculator of the prior art.
Figure 6:
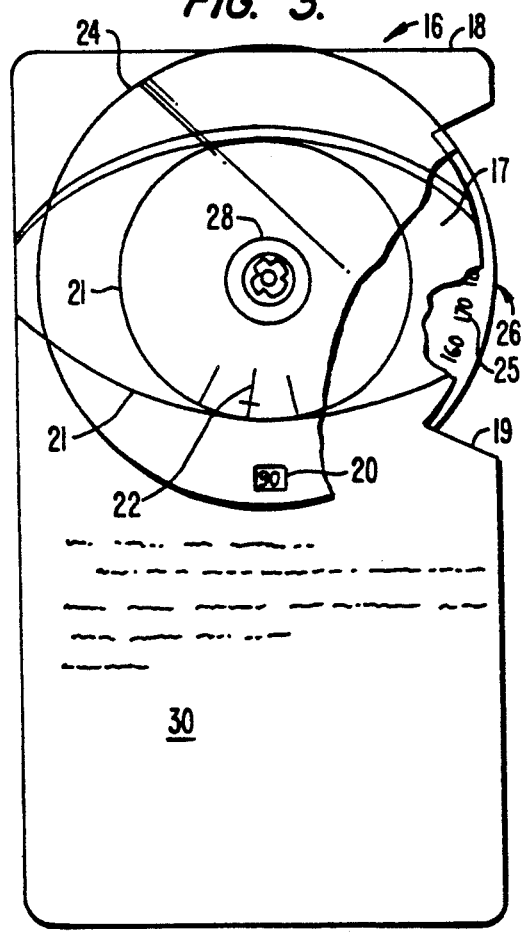
FIG. 6 is a front view of the preferred embodiment of the present invention.
Figure 5:
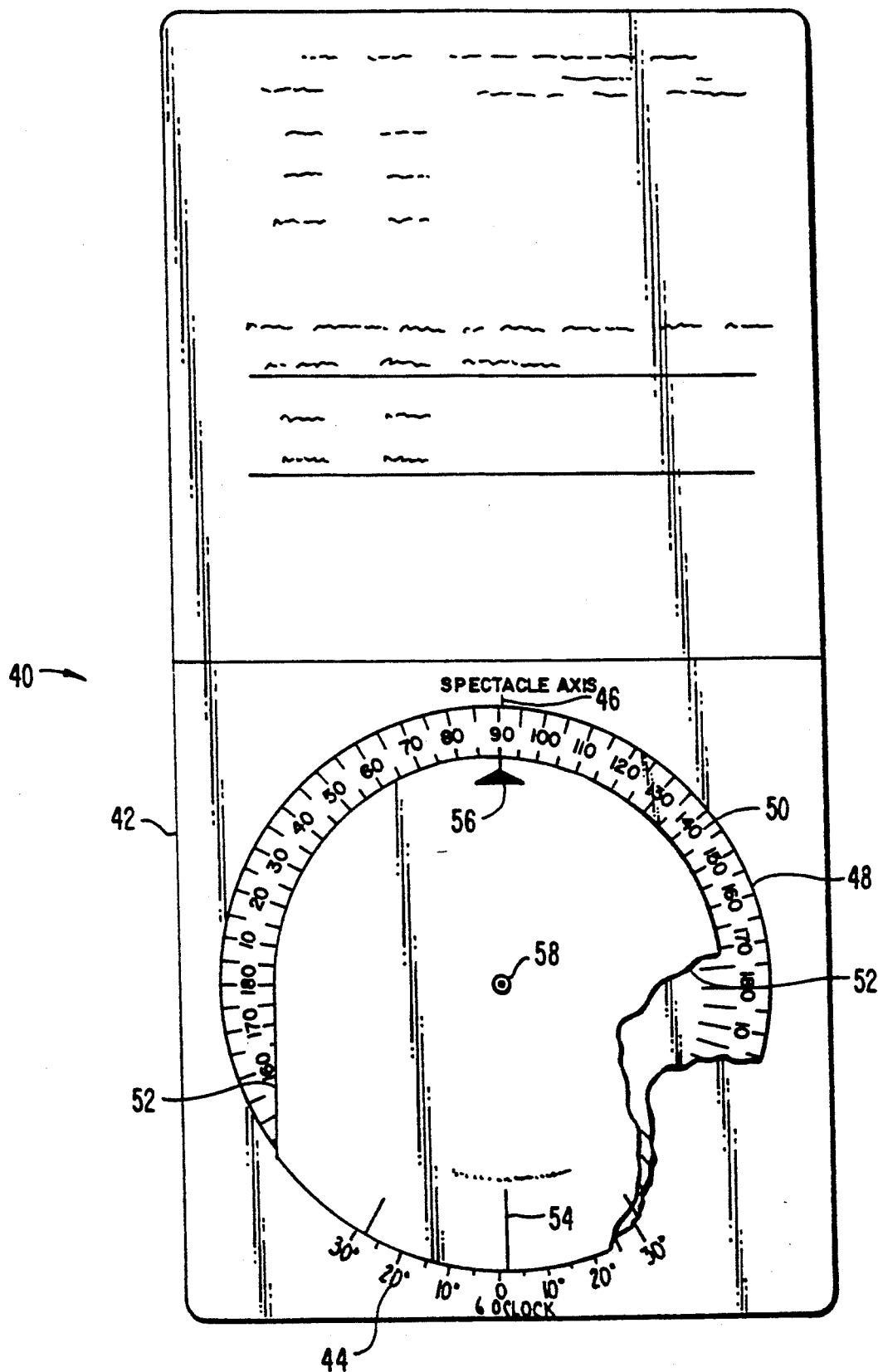
FIG. 5 is a front view of a second toric axis calculator of the prior art.

Referring now to FIG. 6, a preferred embodiment 16 of the invention is shown. Accordingly, a card 18 is shown having a window 20. A transparent dial 24 having a reference symbol 22 is rotatably on a front face 17 of card 18. Reference symbol 22 represents an orientation mark on a sample toric contact lens. The front face of card 18 has a representation of a human eye 21 depicted thereon. A protractor dial 26 is rotatably mounted on a rear face of the card 16 and has a counter-clockwise protractor scale 25 from at least 0° to 180° about its periphery. Transparent dial 24, card 18, and protractor dial 26 are coaxially and rotatably joined at attachment hub 28. Window 20 and protractor dial 26 are positioned so that the numerals of the protractor scale 25, depicted on dial 26, are visible through window 20.

The toric axis calculator 16 of the present invention will be employed after a trial toric contact lens has been placed on the patient's eye for at least 10 to 20 minutes, and most preferably when rotational rocking of the contact lens is no more than 5°.

Two preparatory steps are carried out when employing the calculator 16: (1) protractor dial 26 will first be rotated so that the prescription axis shows through window 20; and (2) reference symbol 22 will then be aligned to correspond with the initial position of orientation mark 3 of the sample contact lens 4 on the patient's eye. Thereafter, the protractor dial 26 and transparent dial 24 are jointly rotated, i.e., are rotated together through the same angle of rotation, until reference symbol 22 is visually aligned with the settled position of the orientation mark 3 on the sample contact lens 4. A cut-away portion 19 of card 18 facilitates the user's ability to grasp the transparent dial 24 and protractor dial 26, so that these two dials may be moved in unison.

During the foregoing steps, the device 16 will be maintained in an upright orientation relative to the patient's eye. The eye diagram 21 on card 18 will facilitate consistent orientation. Lastly, after joint rotation of dials 24 and 26 has been accomplished, the numeral on the protractor scale corresponding to the therapeutic axis will be visible through the window of the protractor dial.

In a preferred aspect of the present invention, hub 28 will be constructed such that sufficient frictional force is present between the transparent dial 24 and the protractor dial 26 to facilitate their joint movement. However, the frictional force will not be so great as to preclude individual rotation of the dials when placing the numeral corresponding to the prescription axis at the index window, or when aligning the reference symbol with the initial position of the orientation mark on the test contact lens.

A region 30 of card 18 may advantageously have directions for utilizing the device depicted thereon. The transparent dial 24 may be constructed from any conventional transparent material such as vinyl, acrylic, or polycarbonate, so that the window 20 and the eye illustration 21 may be seen therethrough. Card 18 and protractor dial 26 may be produced from conventional sheet materials such as cardboard or plastic. The choice of materials depending on the cost of production, or desired durability.

Preferred embodiment 16 has the advantage that the numerals of the protractor dial are visible only through window 20. Most advantageously, when the calculator 16 has been used according to the foregoing description only the precise numeral corresponding to the therapeutic axis is shown at window 20. Thereby, the possibility of inadvertently reading an incorrect number is precluded.

An alternate preferred embodiment of the present invention entails a device which corresponds to that of the preferred embodiment, except that the numerals for the angles of the protractor scale are depicted on the protractor dial in a clockwise direction. As was the case with the preferred device, prior to utilizing the alternate preferred device a test toric lens 4 with an orientation mark 3 at a known initial position is placed on a patient's eye; the lens is then allowed to settle on the patient's eye, so that the orientation mark rotates to a final position. The first circular dial of alternate preferred device, which has a clockwise protractor scale, is rotated so that the angle value on the protractor scale equal to the prescription axis shows through the window 20 of the card. The reference symbol 22 on the transparent dial 24 is then aligned with the final position of the orientation mark 3 on the rotated settled test lens. Thereafter, the first circular dial and the transparent dial are rotated in unison, so that the reference symbol 22 will become aligned with the known initial position of the orientation mark of the test lens. Lastly, the value of the effective axis is determined by reading the value on the protractor scale which is visible through the window of the card.

Modification and variation can be made to these disclosed embodiments without departing from the subject of the invention as defined in the following claims. For example, window 20 could be placed at a 3 o'clock position to more readily correspond with toric contact lenses produced by some manufacturers, which have the orientation mark at the 3 o'clock position.

What is claimed is:

1. A toric axis calculator comprising:
   a card having a front face, a rear face, and a window therethrough;
   a first circular dial rotatably mounted on the rear face of the card, said first dial having a protractor scale with markings from 0° to 180° disposed along its periphery so that they can be observed through the window as the dial is rotated; and
   a transparent circular dial rotatably mounted on the front face of the card, said transparent dial being coaxial with the first circular dial, whereby the circular dial and the transparent dial may be rotated separately or together, and said transparent dial including at least one reference symbol for alignment with the position of an orientation mark on a test toric lens, whereby the protractor markings remain visible through the window.

2. A toric axis calculator as in claim 1, wherein the first circular dial and the transparent circular dial have substantially identical diameters, and are disposed so that a portion of their common peripheries will extend beyond an edge of the card, whereby a user can simultaneously grasp and rotate both dials relative to the card.

3. A toric axis calculator as in claim 2, wherein the edge of the card defines a notched region, and the dial peripheries are exposed within the notched region.

4. A toric axis calculator as in claim 1, further comprising an image of an eye on the front face of the card to facilitate alignment of the reference mark.

5. A toric axis calculator as in claim 1, wherein the markings of the protractor scale are disposed in a clockwise direction.

6. A toric axis calculator as in claim 1, wherein the markings of the protractor scale are disposed in a counterclockwise direction.

7. The calculator as in claim 1, wherein the window is at a six o'clock position on the card.

8. The calculator as in claim 1, wherein the window is at a three o'clock position on the card.

9. A method for fitting a toric contact lens so as to determine a therapeutic axis based on a prescription axis, said method using a toric axis calculator including a card having a window therethrough, a first circular dial having a peripheral protractor scale with marking defining at least one counter-clockwise protractor scale of 0° to 180° about its periphery and being rotatably mounted on a rear face of the card so that the scale markings can be observed through the window as the dial is rotated, and a transparent circular dial including a reference symbol rotatably mounted on the front face of the card coaxially with the first circular dial, said method comprising:
  placing a test toric lens on a patient's eye, where said toric lens has an orientation mark at a known initial position;
  allowing the test toric lens to settle on the patient's eye so that the orientation mark rotates to a final position;
  rotating the first circular dial relative to the card, to position an angle on the protractor scale equal to the prescription axis with the window of the card;
  aligning the reference symbol on the transparent dial with the known initial position of the test lens orientation mark when the test lens is placed on the patient's eye;
  rotating the first circular dial and the transparent dial in unison, to bring the reference symbol to the final position of the orientation mark on the patient's eye; and
  reading the value of the therapeutic axis on the protractor scale through the window of the card.

10. The method of claim 9, wherein the known initial position of the orientation mark is at six o'clock.

11. The method of claim 9, wherein the known initial position of the orientation mark is at three o'clock.

12. A method for fitting a toric contact lens so as to determine an effective axis based on a prescription axis, said method using a toric axis calculator including a card having a window therethrough, a first circular dial having a peripheral protractor scale with markings defining at least one clockwise protractor scale of 0° to 180° about its periphery and being rotatably mounted on a rear face of the card so that the scale markings can be observed through the window as the dial is rotated, and a transparent dial including a reference symbol rotatably mounted on the front face of the card coaxially with the first circular dial, said method comprising:
  placing a test toric lens on a patient's eye, where said toric lens has an orientation mark at a known initial position;
  allowing the test toric lens to settle on the patient's eye so that the orientation mark rotates to a final position;
  rotating the first circular dial relative to the card to position an angle on the protractor scale equal to the prescription axis with the window of the card;
  aligning the reference symbol on the transparent dial with the final position of the orientation mark on the rotated test lens;
  rotating the first circular dial and the transparent dial in unison to align the reference symbol with the known initial position of the orientation mark of the test lens; and
  reading the value of the effective axis on the protractor scale through the window of the card.

13. The method of claim 12, wherein the known initial position of the orientation mark is at six o'clock.

14. The method of claim 12, wherein the known initial position of the orientation mark is at three o'clock.

* * * * *